United States Patent [19]

Gomez et al.

[11] 4,215,024

[45] Jul. 29, 1980

[54] MOLDING COMPOSITIONS AND PROCESS FOR PREPARING SAME

[75] Inventors: I. Luis Gomez, Longmeadow; Edward F. Tokas, West Hatfield, both of Mass.

[73] Assignee: Monsanto Company, St. Louis, Mo.

[21] Appl. No.: 957,301

[22] Filed: Nov. 2, 1978

[51] Int. Cl.$^2$ .............................................. C08L 91/00
[52] U.S. Cl. ................................. 260/23 S; 260/4 R; 260/4 AR; 260/23 R
[58] Field of Search ................... 260/23 S, 23 R, 4 R, 260/4 AR

[56] References Cited

U.S. PATENT DOCUMENTS

| | | | |
|---|---|---|---|
| 2,900,359 | 8/1959 | Chapin et al. | 260/23 S |
| 3,355,404 | 11/1967 | Ruffing et al. | 260/23 S |
| 3,438,971 | 4/1969 | Walker | 260/23 S |
| 3,863,014 | 1/1975 | Mottus | 526/218 |
| 3,870,802 | 3/1975 | Harris et al. | 426/106 |
| 3,900,120 | 8/1975 | Sincock | 428/35 |
| 3,931,074 | 1/1976 | Gomez | 260/23 R |
| 3,947,431 | 3/1976 | Gomez | 426/106 |

OTHER PUBLICATIONS

The Chemistry of Acrylonitrile, American Cyanamid Company, second edition, copyright 1959, pp. 13, 14 & 77.

*Primary Examiner*—Ronald W. Griffin
*Attorney, Agent, or Firm*—Michael J. Murphy

[57] ABSTRACT

Improved molding compositions and a dry blend process for preparing same, such compositions being especially adapted for shaping into packaging materials, and comprising a blend of a nitrile polymer and an unsaturated fatty acid compound.

12 Claims, No Drawings

MOLDING COMPOSITIONS AND PROCESS FOR PREPARING SAME

CROSS REFERENCE TO RELATED APPLICATION

Chemically Reducing Acrylonitrile Monomer In Nitrile Polymers And Shaped Packaging Materials Formed Therefrom, I. Luis Gomez, Edward F. Tokas, U.S. Ser. No. 957,295, Filed Nov. 2, 1978.

BACKGROUND OF THE INVENTION

This invention relates to molding compositions and more particularly to improved molding compositions and a process for preparing same wherein such compositions are especially adapted for shaping into products such as packaging materials wherein free AN monomer therein is minimal.

Thermoplastic nitrile polymer compositions containing polymerized AN can be shaped into a wide variety of useful articles by conventional techniques such as extrusion, milling, molding, drawing, blowing, etc. Applications for such shaped articles are widespread and include structural units where properties such as stiffness, impact resistance, dimensional stability, high gloss and toughness are required, for example pipe, bars, appliance housings, car parts, refrigerator liners and the like, replacements for glass for weight reduction as for automotive lenses, layer(s) in laminated windshields, security panels and/or other multi-layer structural laminates. When the polymerized AN level is at least about 50 weight percent, the compositions uniquely exhibit excellent solvent resistance and low permeability to liquids and gases which make them especially useful as a lightweight substitute for glass in packaging and particularly in the manufacture of bottles, film, sheet, tubs, cups, trays and other containers for liquids and solids.

In manufacturing nitrile polymer compositions, it is well known and has been tolerated that trace levels of free, unconverted AN monomer remain absorbed within the polymer particles when polymerization is not 100% complete and which is therefore present in products formed therefrom. Recently, however, certain government regulatory agencies are moving toward establishing maximum permissible levels of AN monomer in the environment on grounds that excess AN in the atmosphere generated during handling and working of these resins may constitute a health hazard in view of the toxicity of AN monomer. Regulations in particular have been applied to packaging materials intended for contact with environmentally sensitive products such as food, beverages, pharmaceuticals, cosmetics and the like for which application nitrile polymers are especially suited.

Efforts to reduce free, unreacted AN in nitrile polymers in response to such government pronouncements have involved steam stripping the polymer before melt processing, and when carried out for a sufficient time this can greatly reduce the residual monomer to miniscule levels. However, even with polymer initially having extremely low residual AN content, it was unexpectedly discovered that free AN monomer is thermally regenerated due to polymer unzipping up to levels on the order of 10 times the initial level during melting at standard melt processing times and temperatures. Such an increase caused an associated increase in extractable AN from shaped packaging materials in contact with food simulating solvents. Accordingly, reduction of AN monomer in the raw polymer proved unsuccessful in minimizing AN in shaped products formed in an operation involving melt processing.

SUMMARY OF THE INVENTION

Now, however, improvements have been developed to minimize such prior art shortcomings.

Accordingly, a principal object of this invention is to provide polymeric molding compositions containing polymerized acrylonitrile which minimize generation of free AN monomer during conversion to melt form.

Another object is to selectively provide in a polymerized-acrylonitrile-containing molding composition, a chemical scavenger for or regulator of AN monomer which is effective at miniscule levels of AN monomer to minimize generation of the latter during melt processing of such compositions.

A further object is to provide such a molding composition and a process for preparing same which contains a scavenger at low concentrations which is compatible with the polymer to avoid the need of excess amounts which could cause deterioration of properties in the shaped product, such as optical (e.g. color and haze) and taste properties which are important in packaging environmentally sensitive materials.

Other objects of this invention will in part be obvious and will in part appear from the following description and claims.

These and other objects are accomplished by providing a molding composition comprising a blend of a nitrile polymer containing at least about 10 weight percent based on total polymer weight of polymerized acrylonitrile and about 0.005 to about 2% by weight based on the weight of the polymer of an unsaturated fatty acid compound.

From a process standpoint there is provided a process for preparing an extruded pelleted molding composition which comprises dry blending a nitrile copolymer containing free acrylonitrile monomer with about 0.005 to about 2% by weight based on the weight of the polymer of an unsaturated fatty acid compound wherein the nitrile copolymer comprises at least about 10% by weight of polymerized acrylonitrile, melting and extruding the resulting blend, and then pelletizing the extrudate.

PREFERRED EMBODIMENTS

Nitrile polymers useful in the molding compositions of the present invention generate free AN monomer during melting and contain at least about 10% by weight of polymerized AN with one or more copolymerized monomers. Such comonomers include:

(a) the monovinylidene aromatic hydrocarbon monomers of the formula:

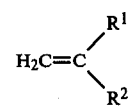

wherein $R^1$ is hydrogen, chlorine or methyl and $R^2$ is an aryl group of 6 to 10 carbon atoms and may also contain substituents such as halogen as well as alkyl groups attached to the aromatic nucleus, e.g., styrene, alpha methylstyrene, vinyl toluene, alpha chlorostyrene, ortho chlorostyrene, meta chlorostyrene, para chlorostyrene, ortho methylstyrene, para methylstyrene, ethyl styrene, isopropyl styrene, dichloro styrene, vinyl naphthalene, etc.

(b) lower alpha olefins of from 2 to 8 carbon atoms, e.g., ethylene, propylene, isobutylene, butene-1, pentene-1 and their halogen and aliphatic substituted derivatives, e.g., vinyl chloride, vinylidene chloride, etc.

(c) acrylic acid and methacrylic acid and the corresponding acrylate methacrylate alkyl esters where the alkyl group contains from 1 to 4 carbon atoms, e.g., methyl acrylate, ethyl acrylate, propyl acrylate, methyl methacrylate, etc.

(d) vinyl esters of the formula:

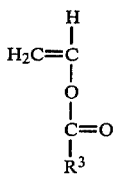

wherein $R^3$ is hydrogen, an alkyl group of from 1 to 10 carbon atoms, an aryl group of 6 to 10 carbon atoms, e.g., vinyl formate, vinyl acetate, vinyl propionate, vinyl benzoate, etc., (e) vinyl ether monomers of the formula:

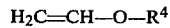

wherein $R^4$ is an alkyl group of from 1 to 8 carbon atoms, an aryl group of from 6 to 10 carbon atoms or a monovalent aliphatic radical of from 2 to 10 carbon atoms, which aliphatic radical may be hydrocarbons or oxygen-containing, i.e., an aliphatic radical with ether linkages and may also contain other substituents such as halogen, carbonyl, etc. Examples of these monomeric vinyl ethers include vinyl methyl ether, vinyl ethyl ether, vinyl n-butyl ether, vinyl 2-chloroethyl ether, vinyl n-butyl ether, vinyl 2-chloroethyl ether, vinyl phenyl ether, vinyl cyclohexyl ether, 4-butyl cyclohexyl ether, and vinyl p-chlorophenylene glycol ether, etc.

(f) olefinically unsaturated mononitriles having the formula:

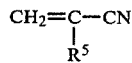

wherein $R^5$ is an alkyl group having 1 to 4 carbon atoms or a halogen. Such compounds include methacrylonitrile; ethacrylonitrile; propioacrylonitrile, alpha chloracrylonitrile, etc.

Additional comonomers useful in the practice of this invention are those comonomers which contain a mono- or di-nitrile function. Examples of these include methylene glutaronitrile, 2,4-dicyanobutene-1, vinylidene cyanide, crotonitrile, fumaronitrile, maleonitrile.

Preferred comonomers are the monovinylidene aromatic hydrocarbons, lower alpha olefins, acrylic and methacrylic acid and the corresponding acrylate and methcrylate esters, with the monovinylidene aromatic hydrocarbons being more particularly preferred. Most specifically preferred is styrene and alpha methylstyrene. Another preferred composition is a terpolymer of acrylonitrile, styrene and vinyl ether such as disclosed in U.S. Pat. No. 3,863,014.

The amount of comonomer as defined above present in the nitrile composition can vary up to about 90% by weight based on the total weight of the nitrile polymer composition. Preferred nitrile compositions for packaging applications requiring excellent oxygen and water vapor barrier properties in the packaging materials contain at least about 50%, e.g., from about 50 to 90% by weight of polymerized acrylonitrile monomer and from about 10 to about 50 % by weight of comonomer and more preferably from about 55 to about 85% by weight of acrylonitrile monomer and from about 15 to about 45% by weight of comonomer, all based on total polymer weight.

Nitrile polymers within the scope of this invention may also contain an elastomer in the form of a synthetic or natural rubber component such as polybutadiene, isoprene, neoprene, nitrile rubbers, natural rubbers, acrylonitrilebutadiene copolymers, ethylene-propylene copolymers, chlorinated rubbers, etc. which are used to strengthen or toughen products such as shaped packaging materials. This rubber component may be incorporated into the nitrile polymer by any of the methods well known to those skilled in the art, e.g., direct polymerization of monomers, polyblends, grafting the acrylonitrile monomer mixture onto the rubbery backbone, etc. Especially preferred are polyblends derived by mixing a graft copolymer of acrylonitrile and comonomer on the rubbery backbone with another copolymer of acrylonitrile and the same comonomer. Generally, such rubber component may comprise from 0 to about 25% and preferably up to about 10% by weight of the nitrile polymer composition.

The active treating ingredient in the molding compositions of this invention for reducing the free AN monomer content of the nitrile polymer is an unsaturated fatty acid or mixture of such acids per se, glycerides of such acids, mixtures of such acids and glycerides and compounds such as safflower and linseed oils and the like (further described hereafter) which yield an unsaturated fatty acid or glyceride upon heating or processing or else behave as an unsaturated fatty acid or unsaturated fatty acid donor in the presence of nitrile polymers. Preferably such acids and esters comprise those having the formula

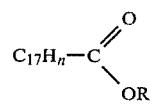

where n is 29 to 33 and R is hydrogen or glyceride. Specifically, such acids comprise $C_{18}$ acids such as oleic acid ($C_{17}H_{33}COOH$), linoleic acid ($C_{17}H_{31}COOH$) and linolenic acid ($C_{17}H_{29}COOH$), with the esters being those glycerides formed by replacing the OH—group of such a $C_{18}$ acid with a glycerol radical—i.e. $(CH_2OH)_2$-CHO—or $(CHOH)(CH_2OH)CH_2O$—. Such unsaturated fatty acids and glycerides are found in mixture in linseed and safflower oils with the latter being especially preferred since it is available in natural form and is especially rich (about 77 weight percent) in the polyunsaturated glyceride of linoleic acid.

The amount of unsaturated fatty acid compound in the molding compositions used in the present invention is calculated to reduce the free residual acrylonitrile monomer (RAN) in the nitrile polymer after melting to less than about 7 ppm and preferably to less than about 4 ppm, which reduced levels of RAN in the polymer should in turn result in proportionately reduced extractable AN monomer levels from shaped packaging materials formed of the polymer in contact with food, pharmaceuticals, margarine, butter or like substances. Such unsaturated fatty acid amount should be insufficient to impart any fatty acid-originated taste to any such packaged substances. Allowance should also be made for vaporization of some of the admixed fatty acid during melting of the nitrile polymer. In general the scavenging or regulating amount of unsaturated fatty acid required to achieve this reduction in residual and extractable AN content will be in the range of from about 0.005 to about 2.0% by weight based on the weight of the nitrile polymer. In most applications the amount of unsaturated fatty acid compound will be in the range of from about 0.01 to about 1.5% by weight. When using a compound which yields an unsaturated fatty acid or else behaves as a donor thereof, the amount of such unsaturated fatty acid compound is calculated so as to provide an amount within the preceding ranges.

As stated, the improved molding composition of this invention comprise an intimate blend of nitrile polymer and an unsaturated fatty acid compound. The intimate mixture of fatty acid and nitrile polymer may be obtained by combining the fatty acid compound with the nitril polymer after polymerization, as for example, by adding it to the nitrile polymer in the polymer recovery steps such as during coagulation, stripping, washing, drying, etc., or by steeping the polymer in the presence of the unsaturated fatty acid compound. Another method is to dry blend the nitrile polymer and unsaturated fatty acid prior to the melting step used in shaping the polymer. In still another method the unsaturated fatty acid compound and nitrile polymer are dispersed in a liquid medium followed by evaporation of the liquid medium. In still another method, the unsaturated fatty acid is injected into the molten polymer during the melting operation. Other methods of forming the intimate mixture will become apparent to those skilled in the art upon reading the present specification.

In general, the preferred method of admixing the nitrile polymer and unsaturated fatty acid are blending the nitrile polymer in dry form with the unsaturated fatty acid.

The forming operations used to prepare products from the molding compositions of this invention such as the preferred polymeric packaging materials, e.g., film, sheet, tubs, trays, containers such as bottles, cans, jars, etc., preforms for forming same and the like, are carried out by shaping the molding compositions by procedures known in the art. In this connection, conventional plasticators can be used utilizing a screw rotating within a plasticizing zone to masticate the polymer wherein the screw is either axially fixed or reciprocable, the latter occurring for example in an injection molding system. The forming operations include both a melting step wherein the nitrile polymer is converted from solid to melt form by physical working at temperatures in the range of from 93° C. to about 274° C. and any subsequent shaping step performed on the melt. The melting and shaping steps may occur sequentially or substantially simultaneously. Examples of forming operations used to prepare polymeric packaging materials include pelletizing, extrusion, blow molding, injection molding, compression molding, mill rolling, calendering, vacuum forming, plug assist thermoforming from sheet material, combinations of the foregoing and the like.

More than one forming operation wherein the nitrile polymer composition is heated and shaped may be involved in certain instances. This occurs, for example, in the case of a polymer which is heated through working to a melted state, extruded and pelletized and then the pellets are heated again for melting and shaping into a finished end product such as a sheet or into an intermediate sheet or tubular parison which is then reshaped into a container such as a shallow tub or bottle. In such situations, the present invention contemplates having the unsaturated fatty acid compound in contact with the nitrile resin during at least one of the forming operations wherein the polymer is heated to the point where it melts and is then shaped. Preferably when more than one heating step is involved, the fatty acid compound is intimately admixed with the nitrile polymer before or during the first step wherein the polymer is heated to the point where it melts.

The actual measurement of the amount of RAN in products formed of nitrile polymers is not considered part of this invention. In this regard any method capable of detecting AN monomer to about 1 ppm can be used to measure the amount of AN monomer in products of nitrile polymers. Such methods, which are known to those in the art, include colorometric, polarographic, gas chromatographic, fluorometric and electrochemical measurements. Methods for measuring RAN in nitrile polymers to 1 ppm and extractable AN monomer to 10 parts per billion (ppb) in the extract are available to the public upon request from the U.S. Food and Drug Administration and are described in and a part of Food and Drug Administration Regulation No. 121.2629 which is referenced in The Federal Register, Vol. 40, No. 30.

The present invention also contemplates the use of other additives and ingredients in the polymeric compositions which do not adversely affect the properties of the resulting molded products such as taste when such products are packaging materials intended for food contact use. Examples of these ingredients include thermal stabilizers, light stabilizers, dyes, pigments, plasticizers, fillers, antioxidants, lubricants, extrusion aids, scavenger(s) for monomers other than acrylonitrile, etc.

The following examples are set forth in illustration of the invention and should not be construed as limitations thereof. All parts and percentages of resin and unsaturated fatty acid compound are by weight unless otherwise specified. Wherever convenient, residual acrylonitrile is abbreviated as RAN. The amount of unsaturated fatty acid compound is based on the weight of the nitrile polymer. A dash in a Table means that particular product was not tested.

EXAMPLES 1 to 8

A copolymer in bead form containing 68% polymerized AN and 32% polymerized styrene prepared by conventional aqueous polymerization methods was dry blended with various scavenging amounts of various unsaturated fatty acids. Blending to insure intimate admixture of the polymer and unsaturated fatty acid was carried out by placing the quantities of each in a polyethylene bag and shaking vigorously for 2 minutes. The nitrile polymer blends were converted from solid to melt form by physically working the polymer in multiple pass extrusion with a conventional plasticator in the form of a one inch laboratory extruder having a 16:1 L/D ratio fitted with a rotary two stage screw operating at 70 r.p.m. Zone temperatures of the extruder were set to provide a melt stock temperature of approximately 254° C. After each pass, the strand extrudate issuing from the extruder die was chopped into pellets and samples taken which were analyzed for RAN content with the results of these tests tabulated in Table I below.

TABLE I

SUMMARY OF EXAMPLES 1 TO 8

| Ex. | Blended Additive | % Additive | RAN In Starting Beads (ppm) | RAN (ppm) 1 pass | 2 passes | 3 passes |
|---|---|---|---|---|---|---|
| 1 | Control A | 0.0 | 0.7 | 8.8 | — | 14.4 |
| 2 | Linoleic Acid | 0.93 | 0.7 | 9.5 | — | 9.5 |
| 3 | Linolenic Acid | 0.93 | 0.7 | 7.8 | — | 3.8 |
| 4 | Control B | 0.0 | 0.7 | 11.1 | 13.7 | 16.9 |
| 5 | Linolenic Acid | 0.46 | 0.7 | 7.2 | — | 9.8 |
| 6 | Control C | 0.0 | 0.7 | 11.5 | — | 17.0 |
| 7 | Emersol® 233* | 1.0 | 0.7 | 10.9 | — | 5.6 |
| 8 | Emersol® 315** | 1.0 | 0.7 | 8.0 | — | 5.4 |

*A fatty acid mixture available from Emery Industries, Inc. U.S.A. containing 74% oleic acid, 4% linoleic acid and trace amounts of linolenic acid.
**A fatty acid mixture available from Emery Industries, Inc. U.S.A. containing 19% oleic acid, 65.5% linoleic acid and 10.5% linolenic acid. Emersol is a registered trademark of Emery Industries, Inc., Cincinnati, Ohio.

Control Examples 1, 4 and 6 illustrate that without an unsaturated fatty acid compound in the level of RAN in the polymer during melt processing increases ten to about seventeen fold, depending on the number of extrusion passes, vis-a-vis the initial RAN level in the polymer beads. Examples 2, 3, 5, 7 and 8 illustrate that the use of small scavenging amounts of an unsaturated fatty acid compound effectively suppresses and regulates the amount of RAN in the polymer at significantly lower levels than the control at very dilute concentrations of the additive and RAN in the polymer, and in the case of Example 3 maintains such RAN level at no greater than about 4 ppm. In Example 2, incomplete mixing after the single pass is believed to be the reason for the one pass value being higher than control Example 1.

EXAMPLES 9 TO 21

The following Examples 9 to 21 illustrate the present invention in providing shaped products with low RAN content which are intended for packaging environmentally sensitive substances. Nitrile polymer of the type used in Examples 1 to 8 together with an additive of this invention was admixed in a high shear blender (Welex mixer) for 5 minutes at 3000 rpm. The blends were then melt compounded by processing through either a rotary blade Brabender melt mixer (Examples 16 to 19) or a 1¼" rotary screw extruder (all other Examples except 20 and 21) at a stock temperature of 276° C., the extrudate being cut into pellets at the die outlet. Such melt compounded pellets were then remelted and then injection molded in a commercial size injection molding machine at temperatures in the range of from 230° C. to 276° C. into hollow, tubular preforms of circular cross section, closed at one end and having a molded finish at the other end. Such preforms are further described in U.S. Pat. No. 3,900,120, col. 5, lines 13-42, the content of which is incorporated herein by reference. The polymer forming such preforms and bottles was free of rubber-containing impact modifiers with the walls thereof considered to contain the reaction product of (a.) an AN chemical scavenger, i.e., an unsaturated fatty acid and (b.) AN monomer. After cooling to room temperature, preforms formed as just described were reheated to molecular orientation blowing temperature of about 132° to 138° C. and then distended in a conventional blow mold into 32 ounce (950 cc.) self-supporting bottles intended for packaging beverages and the like. The level of RAN in the bottles was then determined. The results of these tests are tabulated in Table II below.

TABLE II

SUMMARY OF EXAMPLES 9 TO 21

| Ex. | Blended Additive | % | RAN (ppm) Bottle |
|---|---|---|---|
| 9 | Control | 0.0 | 8.1 |
| 10 | Safflower Oil | 0.05 | 5.2 |
| 11 | Safflower Oil | 0.10 | 3.5 |
| 12 | Safflower Oil | 0.15 | 3.1 |
| 13 | Safflower Oil | 0.5 | 3.1 |
| 14 | Linseed Oil | 0.05 | 3.7 |
| 15 | Linolenic Acid | 1.0 | 4.3 |
| 16 | Control | 0.0 | 19.0 |
| 17 | Linseed Oil | 0.25 | 12.5 |
| 18 | Control | 0.0 | 17.0 |
| 19 | Linolenic Acid | 1.0 | 9.9 |
| 20 | Control* | 0.0 | 10.2 |
| 21 | Linolenic Acid* | 0.05 | 6.6 |

*(1.) Components were dry blended instead of melt compounded.
(2.) Contained 1.25% of a coagulated and dried rubber crumb latex comprising: butadiene 30-34%, styrene 38-42%, acrylonitrile 16-20%, methyl methacrylate 8-10%, ethylene glycol dimethyl stearate 0.5-1%.

The above data illustrates the efficiency of low levels of polyunsaturated fatty acids in reducing the amount of RAN in the walls of containers formed of nitrile resins according to the invention, in some cases (Examples 11, 12, 13 and 14) to less than 4 ppm in such bottles. The additional minimal heat history experienced by the preforms in reheating to bottle blowing temperatures is not considered to have significantly affected RAN level, and in any event, the RAN level in such preforms should in all cases at least be no greater than in bottles formed therefrom. Bottle optical quality in all Examples was visually noted and considered acceptable for packaging use.

To the best of applicants' knowledge, substitution of nitrile polymers containing levels of polymerized AN down to about 10% and specifically to about 20%, the latter being known as styrene/acrylonitrile (SAN) resins, as well as copolymers of styrene and acrylonitrile containing an elastomer which are known as ABS resins, for those of the foregoing Examples should give comparable low level regulation of RAN in the melted resin and shaped products at comparable starting levels of free AN in the initial raw material polymer.

Similarly, shaped packaging materials such as bottles for holding beverages, film or sheet material useful as overwrappings, tubs or cup-like containers useful in holding margarine, butter and similar-based food products as well as trays for holding meats, etc., should yield low levels of extractable RAN by such foods or by food simulating solvents because of the low RAN levels in such shaped materials per se. As polymerized AN level in the polymer decreases, RAN extraction level can be expected to increase for comparable free AN monomer levels in the polymer.

The preceding description is set forth for purposes of illustration only and is not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. A molding composition comprising a blend of a nitrile polymer containing at least about 10 weight percent based on total polymer weight of polymerized acrylonitrile and about 0.005 to about 2% by weight based on the weight of the polymer of an unsaturated fatty acid compound, said blend being free of rubber containing impact modifiers.

2. A molding composition as in claim 1 wherein the nitrile polymer comprises at least about 50% by weight of polymerized acrylonitrile.

3. A molding composition as in claim 1 wherein the nitrile polymer comprises from about 50 to about 85 weight percent acrylonitrile.

4. A molding composition as in claim 3 wherein styrene is a copolymerized monomer.

5. A molding composition as in claims 1, 2, 3 or 4 wherein said unsaturated fatty acid compound is linseed oil or safflower oil.

6. A molding composition as in claim 4 wherein the nitrile polymer further contains from about 0 to about 25% by weight of a synthetic or natural rubber component.

7. A molding composition as in claim 5 wherein the nitrile polymer further contains from about 0 to about 25% by weight of a synthetic or natural rubber component.

8. A process for preparing an extruded pelleted molding composition which comprises:
  (a) dry blending a nitrile copolymer containing free acrylonitrile monomer with about 0.005 to about 2% by weight based on the weight of the copolymer of an unsaturated fatty acid compound wherein the nitrile copolymer comprises at least about 10% by weight of polymerized acrylonitrile;
  (b) melting and extruding the resulting blend; and then
  (c) pelletizing the extrudate to form pellets having a residual acrylonitrile monomer content of less than about 7 ppm based on the weight of the copolymer.

9. The process of claim 8 wherein the nitrile copolymer comprises at least about 50% by weight of polymerized acrylonitrile.

10. The process of claim 8 wherein the nitrile copolymer comprises from about 50 to about 85 weight percent acrylonitrile.

11. The process of claim 10 wherein styrene is a copolymerized monomer.

12. The process of claims 8, 9, 10 or 11 wherein said composition contains linseed oil or safflower oil.

* * * * *